(12) United States Patent
Navasivasakthivelsamy et al.

(10) Patent No.: US 12,355,720 B2
(45) Date of Patent: Jul. 8, 2025

(54) METHOD AND SYSTEM FOR EFFICIENT ADDRESS RESOLUTION IN EXTENDED SUBNETS

(71) Applicant: Nutanix, Inc., San Jose, CA (US)

(72) Inventors: Arunkumar Navasivasakthivelsamy, Sammamish, WA (US); Ramesh Gopalakrishnan Iyer, Fremont, CA (US); Ritesh Rekhi, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 10 days.

(21) Appl. No.: 18/605,391

(22) Filed: Mar. 14, 2024

(65) Prior Publication Data

US 2024/0323158 A1   Sep. 26, 2024

Related U.S. Application Data

(63) Continuation of application No. 17/729,945, filed on Apr. 26, 2022, now Pat. No. 11,956,201.

(Continued)

(51) Int. Cl.
*H04L 61/103* (2022.01)
*H04L 61/58* (2022.01)
*H04L 101/622* (2022.01)

(52) U.S. Cl.
CPC ............ *H04L 61/103* (2013.01); *H04L 61/58* (2022.05); *H04L 2101/622* (2022.05)

(58) Field of Classification Search
CPC . H04L 61/103; H04L 61/58; H04L 2101/622; H04L 12/4641
See application file for complete search history.

(56) References Cited

U.S. PATENT DOCUMENTS 7,095,746 B1 * 8/2006 Frei .................. H04L 61/103
370/389
8,295,289 B2 * 10/2012 Harmatos ........... H04W 12/062
370/328

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Alex Tran
(74) *Attorney, Agent, or Firm* — Shun Yao; Yao Legal Services, Inc.

(57) ABSTRACT

One embodiment of the present invention facilitates address resolution protocol (ARP) resolution in an extended subnet. A gateway of a first segment of the extended subnet can determine that a layer-2 address corresponding to a layer-3 destination address of a packet is locally unavailable. The gateway can then determine whether a respective egress interface of an ARP request for the layer-3 destination address is associated with a layer-2 subnet extension from the first segment to a second segment of the extended subnet. The extension can provide a common layer-2 broadcast domain comprising the first and second segments with a same default gateway layer-3 address. If the egress interface is associated with the extension, the gateway can insert a layer-3 address of a first endpoint associated with the extension as a source protocol address in the ARP request. The gateway can send the modified ARP request via the egress interface.

20 Claims, 8 Drawing Sheets

Related U.S. Application Data

(60) Provisional application No. 63/275,434, filed on Nov. 3, 2021.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 8,904,041 B1* | 12/2014 | Poutievski | H04L 49/25 709/245 |
| 9,438,475 B1* | 9/2016 | Kapadia | H04L 67/561 |
| 9,438,531 B2* | 9/2016 | Freitas | H04L 61/103 |
| 9,515,930 B2 | 12/2016 | Devireddy | |
| 9,772,866 B1 | 9/2017 | Aron et al. | |
| 11,032,369 B1* | 6/2021 | Wei | H04L 61/5007 |
| 11,057,350 B2* | 7/2021 | Janakiraman | H04L 12/4633 |
| 11,115,375 B2* | 9/2021 | Fernando | H04L 41/12 |
| 11,496,436 B2* | 11/2022 | Tarasuk-Levin | H04L 12/4633 |
| 11,646,991 B2* | 5/2023 | Sinha | H04L 61/255 370/392 |
| 2006/0062187 A1* | 3/2006 | Rune | H04L 63/1441 370/338 |
| 2010/0272107 A1 | 10/2010 | Papp | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/ pp. all.

Poitras, Steven. "The Nutanix Bible" (Jan. 12, 2016), from https://nutanixbible.com/ pp. all.

Poitras, Steven. "The Nutanix Bible" (Jun. 9, 2016), from https://nutanixbible.com/ pp. all.

Poitras, Steven. "The Nutanix Bible" (Jan. 3, 2017), from https://nutanixbible.com/ pp. all.

Poitras, Steven. "The Nutanix Bible" (Jun. 8, 2017), from https://nutanixbible.com/ pp. all.

Poitras, Steven. "The Nutanix Bible" (Jan. 3, 2018), from https://nutanixbible.com/ pp. all.

Poitras, Steven. "The Nutanix Bible" (Jun. 25, 2018), from https://nutanixbible.com/ pp. all.

Poitras, Steven. "The Nutanix Bible" (Jan. 8, 2019), from https://nutanixbible.com/ pp. all.

Poitras, Steven. "The Nutanix Bible" (Jul. 25, 2019), from https://nutanixbible.com/ pp. all.

Poitras, Steven. "The Nutanix Bible" (Sep. 17, 2019), from https://nutanixbible.com/ pp. all.

Cano, Ignacio et al. "Curator: Self-Managing Storage for Enterprise Clusters"; University of Washington; published Mar. 2017; pp. all.

Poitras, Steven. "The Nutanix Bible" (Jan. 21, 2020), from https://nutanixbible.com/ pp. all.

Poitras, Steven. "The Nutanix Bible" (Sep. 14, 2020), from https://nutanixbible.com/ pp. all.

Poitras, Steven. "The Nutanix Bible" (Dec. 31, 2020), from https://nutanixbible.com/ pp. all.

Poitras, Steven. "The Nutanix Bible" (Jul. 27, 2022), from https://nutanixbible.com/ pp. all.

Poitras, Steven. "The Nutanix Bible" (Jan. 16, 2024), from https://nutanixbible.com/ pp. all.

Citrix XenDesktop 7.1 on Microsoft Hyper-V Server 2012 R2 on Nutanix Virtual Computing Platform, Solution Design, Jun. 25, 2014.

Poitras, Steven. "The Nutanix Bible" (Jan. 31, 2024), from https://nutanixbible.com/ pp. all.

Poitras, Steven. "The Nutanix Bible" (Feb. 5, 2024), from https://nutanixbible.com/ pp. all.

Poitras, Steven. "The Nutanix Bible" (Jun. 7, 2024), from https://nutanixbible.com/ pp. all.

J. Postel. (1984). Multi-LAN address resolution. RFC 925 (Year: 1984).

Youval Nachum, Linda Dunbar, Ilan Yerushalmi, & Tal Mizrahi. (2015). The Scalable Address Resolution Protocol (SARP) for Large Data Centers. RFC7586. (Year: 2014).

* cited by examiner

METHOD AND SYSTEM FOR EFFICIENT ADDRESS RESOLUTION IN EXTENDED SUBNETS

RELATED APPLICATIONS

This application claims the benefit of U.S. application Ser. No. 17/729,945, titled "METHOD AND SYSTEM FOR EFFICIENT ADDRESS RESOLUTION IN EXTENDED SUBNETS," by inventors Arunkumar Navasivasakthivelsamy, Ramesh Gopalakrishnan Iyer, and Ritesh Rekhi, filed 26 Apr. 2022, the disclosure of which is incorporated by reference herein.

This application claims the benefit of U.S. Provisional Application No. 63/275,434, titled "System and Method for Facilitating Stretched Subnets Sharing a Common Default Gateway IP Address," by inventors Arun Navasivasakthivelsamy, Ramesh Iyer, and Ritesh Rekhi, filed 3 Nov. 2021, the disclosure of which is incorporated by reference herein.

This application is related to U.S. application Ser. No. 17/688,561, titled "Method and System for Efficient Layer-2 Extension for Independently-Managed Subnets," by inventors Arun Navasivasakthivelsamy, Ramesh Iyer, and Ritesh Rekhi, filed 7 Mar. 2022, the disclosure of which is incorporated by reference herein.

BACKGROUND

Field

The present disclosure relates to a communication network. More specifically, the present disclosure relates to efficiently resolving address resolution in subnets with layer-2 extensions.

Related Art

As Internet traffic is becoming more diverse, cluster-based services are becoming progressively more important as a value proposition for distributed systems. In addition, the evolution of virtualized computing has made a multi-client environment attractive and, consequently, placed additional requirements on the distributed systems. For example, a large number of devices (e.g., servers and service appliances) can be distributed across multiple sites (e.g., at geographically distributed locations). Each site may include one or more devices, such as virtual machines (VMs). It is often desirable that the distributed system can facilitate a device management system that can allow a client to configure the devices at a respective site.

Typically, a respective device in a site can be assigned with an Internet Protocol (IP) address. The IP addresses can be allocated from a subnet configured for the site. The site may host one or more of such subnets. Since the client may deploy devices at different sites, the client may configure the same subnet across multiple sites. Hence, the devices belonging to the same subnet can be deployed at different sites. However, individual sites can be managed independently. In particular, devices in a respective site can be managed by an individual instance of the device management system. As a result, maintaining a coherent and error-free subnet across multiple sites can be challenging.

SUMMARY

One embodiment of the present invention provides a system for facilitating efficient address resolution protocol (ARP) resolution in an extended subnet. The system may operate on a gateway of a first network segment of the extended subnet. During operation, the system can determine that a layer-2 address corresponding to a layer-3 destination address of a packet is unavailable in a local data structure associated with ARP. The system can then determine whether a respective egress interface of an ARP request for the layer-3 destination address is associated with a layer-2 subnet extension from the first network segment to a second network segment of the extended subnet. The extension can provide a common layer-2 broadcast domain comprising the first and second network segments. Here, the first and second network segments can be configured with an identical default gateway layer-3 address. If the egress interface is associated with the extension, the system can modify the ARP request by inserting a layer-3 address of a first endpoint associated with the extension as a source protocol address in the ARP request. A data connection between the first endpoint and a second endpoint at the second network segment can facilitate the extension. Subsequently, the system can send the modified ARP request to the second endpoint via the egress interface.

In a variation on this embodiment, the system may insert the layer-3 address by changing the default gateway layer-3 address with the layer-3 address of the first endpoint. Here, the default gateway layer-3 address can be allocated to a gateway interface via which the packet is received.

In a further variation, if the egress interface is not associated with the extension, the system can send the ARP request with the default gateway layer-3 address as a source protocol address in the ARP request via the egress interface.

In a further variation, the default gateway layer-3 address can be further allocated to a second gateway interface of a second gateway of the second network segment.

In a variation on this embodiment, the system can receive, as the gateway, an ARP response to the modified ARP request via the first endpoint. The system can then store an address translation of the ARP response in the local data structure.

In a further variation, the ARP response can include the layer-3 address of the first endpoint associated with the extension as a target protocol address.

In a variation on this embodiment, the system can insert a layer-2 address of the gateway as a source hardware address in the modified ARP request.

In a variation on this embodiment, the data connection can include a tunnel established over a control channel between the first and second endpoints.

In a variation on this embodiment, a respective layer-2 address can be a media access control (MAC) address, and a respective layer-3 address can be an Internet Protocol (IP) address.

BRIEF DESCRIPTION OF THE FIGURES

In the figures, like reference numerals refer to the same figure elements.

DETAILED DESCRIPTION

Figure 1:
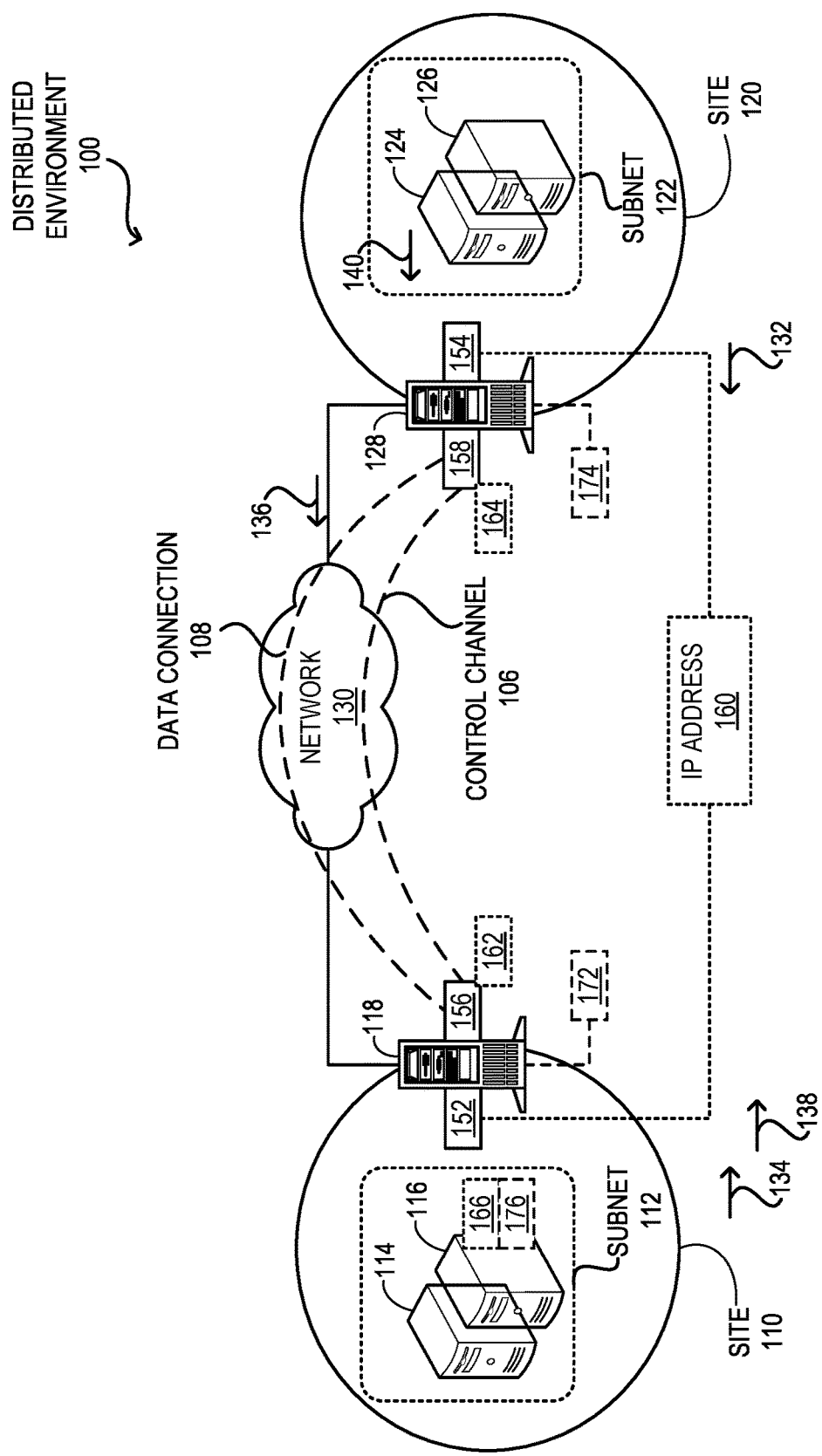
FIG. 1 illustrates exemplary efficient address resolution in extended subnets, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments described herein solve the problem of efficiently facilitating address resolution (e.g., an ARP query resolution) in an extended subnet by (i) generating an ARP request for a respective segment of an extended subnet, and (ii) replacing the sender protocol address (SPA) of the ARP request with the address of the interface associated with the extension for sending to a remote segment of the extended subnet. Hence, the ARP request sent to the remote segment can carry the IP address of the interface coupling the remote segment as the SPA. This allows the ARP response to be forwarded to the gateway issuing the ARP request.

A distributed environment, such as an enterprise or a service provider platform, can be deployed across multiple sites. A service provider environment may facilitate one or more of: infrastructure as a service (IaaS), platform as a service (PaaS), software as a service (SaaS), and variations thereof. A respective site of the distributed environment may include a number of devices. Examples of a device in the site can include, but are not limited to, a server, an appliance, a VM, an application, and a container. The devices of a site are typically managed by a device management system (DMS). Examples of a DMS include, but are not limited to, Prism Central, vRealize Operations (vROps), Turbonomic manager, and Veeam ONE.

A respective device in a site may be configured with an IP address based on a subnet associated with the site using a DMS. The devices belonging to the same subnet often belong to the same layer-2 broadcast domain (e.g., a virtual local area network (VLAN)). Hence, if a subnet is configured at multiple sites, the corresponding layer-2 network can be distributed into corresponding multiple layer-2 network segments. In other words, different segments of the network (e.g., the subnet) may share a common Classless Inter-Domain Routing (CIDR). To facilitate a single layer-2 broadcast domain across the layer-2 network segments, the subnet is often extended among the sites to ensure that the devices can efficiently communicate with each other. Layer-2 subnet extension can involve extending the layer-2 broadcast domain from the subnet of one site to the subnet of another site through a data connection (e.g., a layer-3 connection). This allows devices of the subnet on one site to communicate with devices of the subnet on the other site as if they belong to the same broadcast domain.

To efficiently facilitate the extension, the DMS instance of a respective gateway can configure the local gateway and an extension interface of a control channel between the gateways. The DMS instance can also update the local configuration database with the configuration information. Since interfaces at both sites can be configured to operate as respective endpoints, the resultant data connection can become operational and carry traffic between the subnets. In some embodiments, the data connection can include a tunnel established based on a tunneling protocol. Examples of a tunneling protocol can include, but are not limited to, Virtual Extensible LAN (VXLAN), Generic Routing Encapsulation (GRE), Network Virtualization Using GRE (NVGRE), Overlay transport virtualization (OTV), and Generic Network Virtualization Encapsulation (Geneve).

Upon establishment of the data connection between the interfaces, the layer-2 data traffic of the extended subnets can be forwarded across the data connection as if the devices belong to the same broadcast domain. This allows devices of the subnet on one site to communicate with devices of the subnet on the other site as if they belong to the same broadcast domain. In this way, the DMS instance can use remote procedure calls (RPCs) over the pre-existing control channel between the gateways of the subnets to query each other's configuration database to establish a data connection for facilitating layer-2 subnet extension.

With existing technologies, a respective segment of the network may operate with its default gateway address. To send a packet that includes a destination address outside of the local network, a device may send the packet to the local gateway. Since the network segments in an extended subnet can belong to the same broadcast domain, the gateways of the network segments may share the same default gateway address. For example, the respective gateways of two network segments at two different sites can be assigned with the same default gateway IP address. This allows a device of a network segment to move to another network segment (e.g., due to VM migration) without requiring reconfiguration of the default gateway IP address.

In such a scenario, the gateway may receive a packet destined to the outside of the local segment of the network via a gateway interface participating in the local segment (e.g., the local subnet). Such an interface may be assigned with the default IP address shared with the gateway interface of a remote gateway of another network segment of the extended subnet. Upon receiving the packet, the gateway may determine whether the layer-2 or hardware address (e.g., the media access control (MAC) address) of the device is locally stored in associated with the destination address (e.g., the destination IP address). If the layer-2 address is unknown, the gateway may issue an address resolution protocol (ARP) request for the destination address, which can be referred to as the target protocol address (TPA). The source protocol address (SPA) of the ARP request can be the IP address of the gateway interface.

The ARP request can be broadcasted from the gateway. Consequently, the ARP request can also be forwarded to the other network segment via an extension interface facilitating the layer-3 connection. The gateway can encapsulate the ARP request with an encapsulation header based on the protocol associated with the data connection and forward the encapsulated ARP request to the remote endpoint of the data connection. The remote endpoint, which can be a corresponding extension interface of the remote gateway (e.g., the gateway of the remote network segment), of the layer-3 connection can receive the encapsulated ARP request. The remote gateway can then decapsulate the encapsulation header to obtain the ARP request.

The remote gateway can then broadcast the ARP request in the local network segment. Consequently, the destination device may receive the ARP request and issue an ARP response with the layer-2 address of the local device. The ARP response can include the default IP address as the TPA. However, since the default gateway IP address of the ARP request is shared by the gateway interface of the remote gateway, the ARP response can be directed toward the remote gateway instead of the issuing gateway. As a result, the ARP request may not be resolved at the issuing gateway, and the remote gateway may receive an unsolicited ARP response. Such erroneous forwarding of ARP response may result in traffic disruption in the network.

To solve this problem, upon receiving the packet from the gateway interface, the gateway may replace the SPA of the ARP request with the local IP address of the local extension interface. The gateway can then forward the modified ARP query via the local extension interface. The remote extension interface of the remote gateway can receive the modified ARP request through the layer-3 connection. Consequently, the ARP response from the destination device can then include the IP address of the gateway interface of the issuing gateway as the TPA. As a result, the ARP response can be directed toward the issuing gateway. This allows the issuing gateway to resolve the ARP request efficiently and store the address translation from the ARP response in a local data structure (e.g., in an APR table). Subsequently, the packet can be forwarded to the destination device based on the successful ARP resolution.

In this disclosure, the term "packet" refers to a group of bits that can be transported together across a network. "Packet" should not be interpreted as limiting embodiments of the present invention to any networking layer. "Packet" can be replaced by other terminologies referring to a group of bits, such as "message," "frame," "cell," or "datagram."

The term "switch" is used in a generic sense, and it can refer to any standalone or fabric switch operating in any network layer. "Switch" should not be interpreted as limiting embodiments of the present invention to layer-2 networks. Any physical or virtual device (e.g., a virtual machine, which can be a virtual switch, operating on a computing device) that can forward traffic to an end device can be referred to as a "switch." Examples of such a device include, but are not limited to, a layer-2 switch, a layer-3 router, or a routing bridge.

System Architecture

FIG. 1 illustrates exemplary efficient address resolution in extended subnets, in accordance with an embodiment of the present application. As illustrated in FIG. 1, a distributed environment 100 can be distributed across a number of sites 110 and 120 coupled to each other via a network 130. Here, sites 110 and 120 can be physically (e.g., geographically) or logically (e.g., based on device virtualization) separate sites. Environment 100 can facilitate an enterprise network or a service provider platform. A service provider environment may facilitate one or more of: IaaS, PaaS, SaaS, and variations thereof.

Site 110 can include a number of devices 114, 116, and 118. Similarly, site 120 can include a number of devices 124, 126, and 128. Examples of a client device can include, but are not limited to, a desktop or laptop computer, a server-grade computer, an appliance, a VM, an application, a container, a cellular device, a tablet, a wearable device, a stationary or portable gaming console, a projection device, a network device (e.g., a switch), an attachable dongle, an augmented or virtual reality device, and a vehicular device. Network 130 can be an Ethernet and/or IP network, and a respective switch of network 130 can be an Ethernet switch and/or IP router. Hence, the communication among the switches in network 130 can be based on Ethernet and/or IP. Network 130 may be a local area network (LAN) (e.g., a virtual LAN (VLAN)) or a wide area network (e.g., the Internet).

Since network 130 can be coupled to sites 110 and 120 via devices 118 and 128, respectively, devices 118 and 128 may operate as gateways for sites 110 and 120, respectively. MAC addresses 172 and 174 can be allocated to gateways 118 and 128, respectively, as corresponding hardware addresses. The devices of environment 100 can be managed by a DMS. Examples of a DMS include, but are not limited to, Prism Central, vROps, Turbonomic manager, and Veeam ONE. A respective of gateways 118 and 128 can include an individual device or a plurality of devices operating as a single device. Respective gateway IP addresses can be assigned to gateways 118 and 128. The gateway IP addresses can be a default gateway IP address 160 shared by gateways 118 and 128.

A user may configure subnets 112 and 122 for sites 110 and 120, respectively. Accordingly, a Dynamic Host Configuration Protocol (DHCP) server hosted by the corresponding DMS instance can allocate respective IP addresses of subnet 112 to devices 114 and 116. Similarly, a DHCP server hosted by the corresponding DMS instance can allocate the IP address of subnet 122 to devices 124 and 126. The devices belonging to the same subnet often belong to the same layer-2 broadcast domain (e.g., the same VLAN). Since subnets 112 and 122 are configured at multiple sites, the corresponding layer-2 network can be distributed into corresponding multiple layer-2 network segments. In other words, each of sites 110 and 120 may include one of the layer-2 network segments.

Hence, if subnets 112 and 122 have the same prefix, which may indicate them being the same subnet, subnets 112 and 122 can be extended to facilitate a single layer-2 broadcast domain across the layer-2 network segments of sites 110 and 120, thereby ensuring that their devices can efficiently communicate with each other. Layer-2 subnet extension can involve extending the layer-2 broadcast domain from subnet 112 to subnet 122 (or from subnet 122 to subnet 112) through a data connection (e.g., a layer-3 connection). This allows devices of subnet 112 to communicate with devices of subnet 122 as if they belong to the same broadcast domain.

To efficiently facilitate the extension, the respective DMS instance can configure gateways 118 and 128. Such configuration can include configuring local extension interfaces 156 and 158 of gateways 118 and 128, respectively, that facilitate a control channel 106. Interfaces 156 and 158 can be configured with IP addresses 162 and 164, respectively, from the IP address range of the subnet prefix of the extended subnet. The DMS instance can also update the local configuration database with the configuration information. Since both interfaces 156 and 158 can be configured to operate as respective endpoints, the resultant data connection 108 can become operational between IP addresses 162 and 164. Data connection 108 can then carry traffic between subnets 112 and 122.

In some embodiments, the data connection can include a tunnel established based on a tunneling protocol. Examples of a tunneling protocol can include, but are not limited to, VXLAN, GRE, NVGRE, OTV, and Geneve. Upon establishment of data connection 108 between interfaces 156 and 158, the layer-2 data traffic can be forwarded across data connection 108 as if the devices in subnets 112 and 122 belong to the same broadcast domain. This allows devices of subnet 112 to communicate with devices of subnet 122 as if they belong to the same broadcast domain. In this way, the DMS instance can use RPCs over the pre-existing control channel 106 between to query each other's configuration database to establish data connection 108 for facilitating layer-2 subnet extension.

With existing technologies, subnets 112 and 122 may operate with the default gateway IP addresses, respectively. To send a packet 140 to device 116, device 124 may include IP address 166 of device 116 as the destination address of packet 140 and send packet 140 to gateway 128. Since subnets 112 and 122 can belong to the same broadcast domain based on the extension, gateways 118 and 128 may share the same default gateway IP address 160. This allows a device, such as device 114 of site 110, to move to site 120 (e.g., due to VM migration) without requiring reconfiguration of the default gateway IP address for device 114. In such a scenario, gateway 128 may receive packet 140 via a gateway interface 154 participating in subnet 122.

Here, interface 154 may be assigned with default IP address 160 shared with gateway interface 152 participating in subnet 112. Upon receiving packet 140, gateway 128 may determine whether the layer-2 or hardware address (e.g., the MAC address) of device 116 is locally stored in associated with destination IP address 166 of packet 140. If the layer-2 address is unknown, gateway 128 may issue an ARP request 132 with IP address 166 as the TPA. ARP request 132 can request for the target hardware address (THA) of the device associated with IP address 166. The SPA of ARP request can be IP address 160 of gateway interface 154. Accordingly, the sender hardware address (SHA) of ARP request 132 can be MAC address 174 of gateway 128.

ARP request 132 can then be broadcasted from gateway 128. Consequently, ARP request 132 can also be forwarded to subnet 112 via extension interface 158, facilitating data connection 108. Gateway 118 may receive ARP request 132 via interface 156, which can be the other endpoint of data connection 108. Gateway 118 can then broadcast ARP request 132 in subnet 112. Device 116 may receive ARP query 132 and issue an ARP response 134 with MAC address 176 of device 116. ARP response 134 can include IP address 166 and MAC address 176 as the SPA and SHA, respectively.

However, based on the SPA and SHA of ARP request 132, ARP response 134 can include IP address 160 and MAC address 174 as the TPA and THA, respectively. Since IP address 160 is shared by interfaces 152 and 154, ARP response 134 can be directed toward gateway 118 instead of gateway 128. As a result, ARP request 134 may not be resolved at gateway 128. Hence, gateway 128 may eventually drop packet 140. Furthermore, gateway 118 may receive ARP response 134 as an unsolicited packet. Such erroneous forwarding of ARP response 134 may result in traffic disruption in environment 100.

To solve this problem, upon receiving packet 140 from interface 154, gateway 128 can generate ARP query 132 with IP address 160 and MAC address 174 as the SPA and SHA, respectively. Gateway 128 can broadcast ARP query 132 in subnet 122. However, for a respective egress interface, gateway 128 can determine whether the interface is associated with an extension. If an interface is not associated with the extension, gateway 128 may forward ARP request 132 via the interface to other devices, such as device 126, in subnet 122.

On the other hand, if the interface is associated with an extension, such as interface 158, gateway 128 may replace the SPA of ARP query 132 with IP address 164 of interface 158 to generate modified ARP query 136. MAC address 174 can remain as the SHA of ARP query 136. Gateway 128 can then forward ARP query 136 via interface 158. Gateway 128 can encapsulate ARP request 136 with an encapsulation header based on the protocol associated with data connection 108 and forward encapsulated ARP request 136 to interface 156. Hence, interface 156 of gateway 118 can receive encapsulated ARP request 136 through data connection 108. Gateway 118 can then decapsulate the encapsulation header to obtain ARP request 136 and broadcast it in subnet 112. Consequently, ARP request 136 distributed in subnet 112 can include IP address 164 as the SPA. Hence, device 116 may receive ARP query 136 and issue an ARP response 138 with MAC address 176 of device 116.

ARP response 138 can include IP address 166 and MAC address 176 as the SPA and SHA, respectively. Furthermore, based on the SPA and SHA of ARP request 136, ARP response 138 can include IP address 164 and MAC address 174 as the TPA and THA, respectively. As a result, ARP response 138 can be directed toward gateway 128. Gateway 128 may use an encapsulation header to forward ARP response 138 via data connection 108. Upon receiving ARP response 138, gateway 128 can consider ARP request 132 to be resolved and store the address translation from ARP response 138 in a local data structure. Subsequently, gateway 128 can forward packet 140 using MAC address 176 based on the successful ARP resolution.

Efficient ARP Resolution in an Extended Subnet

Figure 2:
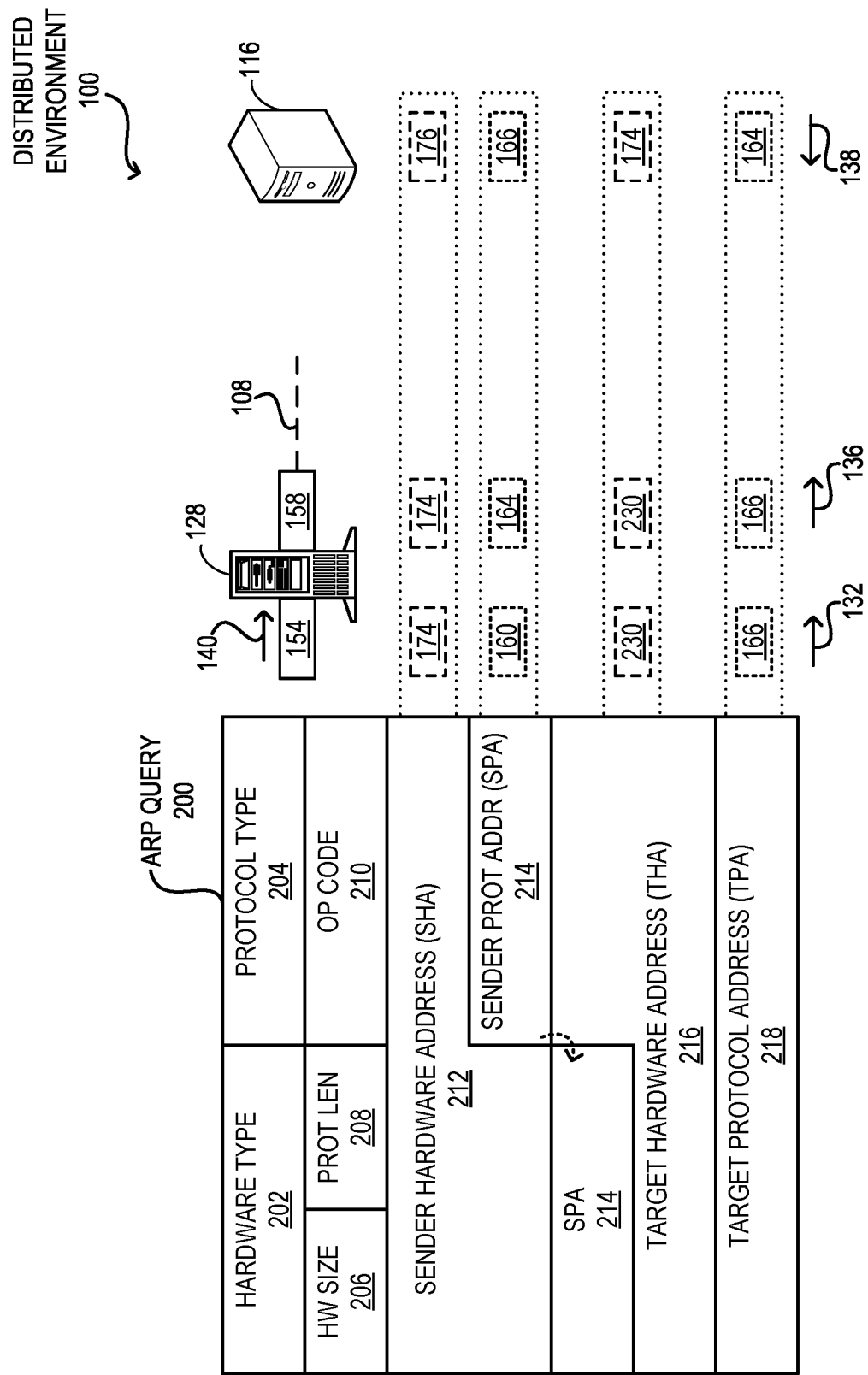
FIG. 2 illustrates an exemplary Address Resolution Protocol (ARP) query for facilitating efficient address resolution in extended subnets, in accordance with an embodiment of the present application.

FIG. 2 illustrates an exemplary ARP query for facilitating efficient address resolution in extended subnets, in accordance with an embodiment of the present application. An ARP query 200 can be used for ARP requests 132 and 136, and ARP response 138. ARP query 200 can include a number of fields, such as hardware type 202, protocol type 204, hardware size 206, protocol length 208, operation code 210, SHA 212, SPA 214, THA 216, and TPA 218. Hardware type 202 and protocol type 204 can indicate the type of layer-2 protocol (e.g., Ethernet) and layer-3 protocol (e.g., IP version 4 or 6), respectively. Similarly, hardware size 206 and protocol length 208 can indicate the size of a respective hardware and protocol address, respectively (e.g., based on the number of bytes).

Operation code 210 can indicate whether ARP query 200 is a request or a response. SHA 212 and SPA 214 can be associated with the device issuing the request or response. On the other hand, THA 216 and TPA 218 can be associated with the intended recipient device of the request or response. Since an ARP request is typically generated when a layer-2 address is unknown, THA 216 can include a default value (e.g., a value of 0 for all bytes) if ARP query 200 is a request. An IP address can be the most commonly used protocol address, and a MAC address can be the most commonly used hardware address. However, ARP query 200 can support other types of protocol, as indicated by hardware type 202 and protocol type 204.

Since gateway 128 may generate an ARP request upon receiving packet 140 on interface 154, SHA 212 and SPA 214 for ARP request 132 can be IP address 160 of interface 154 and MAC address 174 of gateway 128. Furthermore, THA 216 and TPA 218 can include a default value 230 (e.g., a MAC address of 00:00:00:00:00:00) and IP address 166 of device 116. When gateway 128 selects interface 158 for forwarding ARP request 132, gateway 128 can determine that interface 158 is the extension interface associated with data connection 108. Gateway 128 can then generate modified ARP request 136 by replacing IP address 160 with IP address 164 of interface 158 in SPA 214.

Device 116, which is the target device for ARP requests 132 and 136, is reachable via interface 158. As a result, device 116 may receive ARP requests 136. Accordingly, device 116 can generate an ARP response 138 by swapping SHA 212 and SPA 214 with THA 216 and TPA 218, respectively, of ARP request 138. Device 116 can then replace default value 230 with MAC address 176 of device 116. The incorporation of IP address 164 in SPA 214 at interface 158 ensures that ARP response 138 includes a TPA 218 exclusive to issuing gateway 128.

Figure 3:
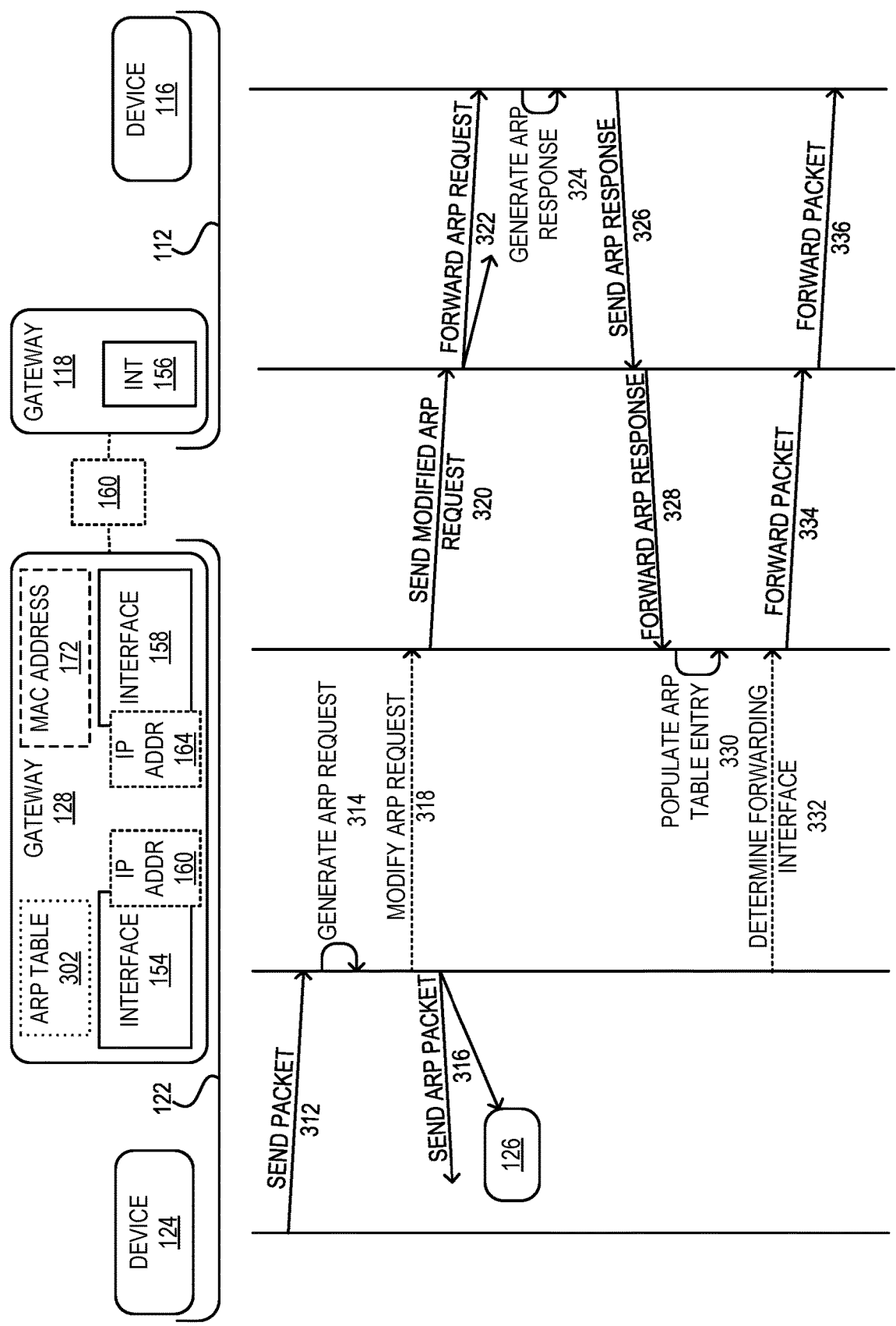
FIG. 3 illustrates exemplary communications for facilitating efficient address resolution in extended subnets, in accordance with an embodiment of the present application.

FIG. 3 illustrates exemplary communications for facilitating efficient address resolution in extended subnets, in accordance with an embodiment of the present application. During operation, device 124 can send a packet, which can be destined to device 116, to gateway 128 (operation 312). If an ARP table 302 of gateway 128 does not include the MAC address of device 116, gateway 128 can generate an ARP request with an SPA that includes the IP address of gateway interface 154 (e.g., IP address 160) (operation 314). Since an ARP request can be a broadcast message, gateway 128 can send the ARP request to other devices, such as device 114, in subnet 122 (operation 316).

To forward the ARP request via interface 158, gateway 128 can modify the ARP request by changing the SPA of the ARP request to the IP address of interface 158 (e.g., IP address 164) (operation 318). Gateway 128 can then send the modified ARP request to interface 156 of remote gateway 118 (operation 320). To do so, gateway 128 can encapsulate the ARP request with an encapsulation header. Gateway 118 may decapsulate the encapsulation header to obtain the ARP request. Gateway 118 can then forward the ARP request to other devices, such as device 116 of subnet 112 (operation 322). Upon receiving the ARP request, device 116 can generate an ARP response with the TPA of the ARP response carrying the IP address of interface 158 (e.g., IP address 164) (operation 324).

Device 116 can then send the ARP response, which can be a unicast packet, toward gateway 128. However, since an ARP query is a layer-2 packet, and gateway 128 is reachable via gateway 118, device 116 may send the ARP response to gateway 118 (operation 316). Gateway 118 can then forward the ARP response to gateway 128 via interface 156 (operation 328). To do so, gateway 118 can encapsulate the ARP response with an encapsulation header. Gateway 128 may decapsulate the encapsulation header to obtain the ARP response. Gateway 128 can then populate the corresponding ARP table entry based on the address translation in the ARP response (operation 330). Since the ARP response is received from interface 158, gateway 128 can learn the MAC address of device 116 from interface 158.

Gateway 128 can then determine the forwarding interface (e.g., interface 158) using the MAC address of device 116 obtained from the ARP response (operation 332). Subsequently, gateway 128 can forward the received packet via interface 158 to gateway 118 (operation 334). Gateway 118 can receive the packet from interface 156. Based on the local learning of the MAC address of device 116, gateway 118 can forward the packet to device 116 (operation 336). In this way, gateways 118 and 128 can facilitate an efficient address resolution in an extended subnet.

Operations

Figure 4A:
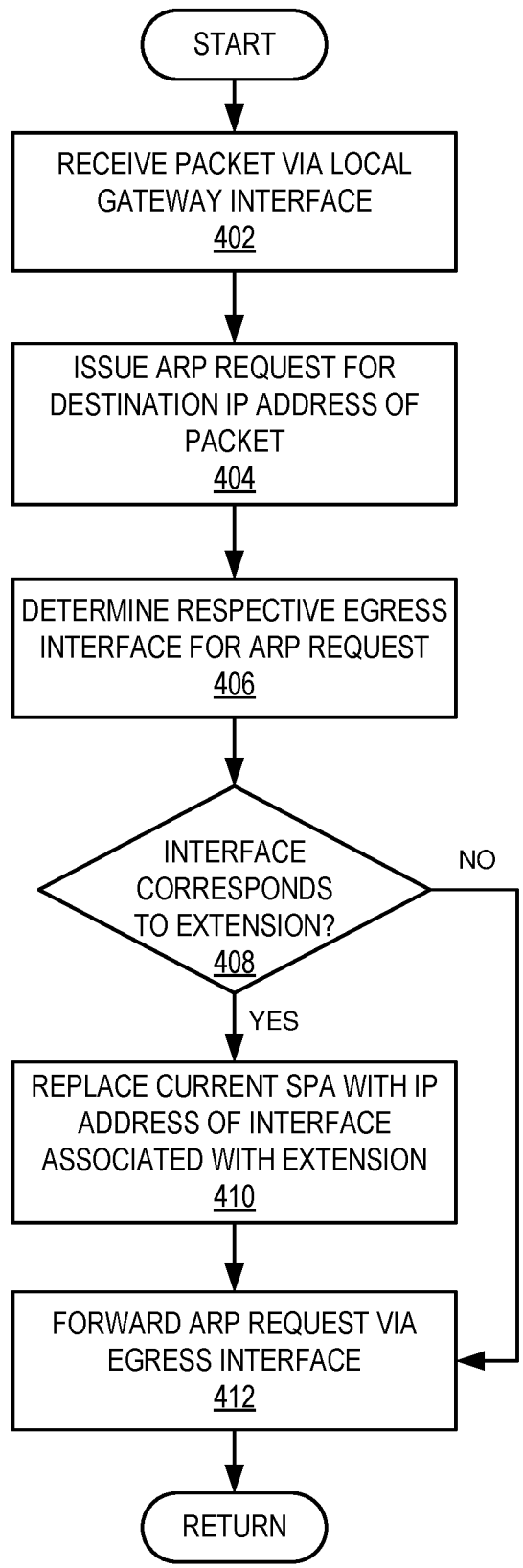
FIG. 4A presents a flowchart illustrating the process of a gateway of an extended subnet forwarding an ARP request to a remote segment of the extended subnet, in accordance with an embodiment of the present application.

FIG. 4A presents a flowchart illustrating the process of a gateway of an extended subnet forwarding an ARP request to a remote segment of the extended subnet, in accordance with an embodiment of the present application. During operation, the gateway can receive a packet via a local gateway interface (e.g., the interface associated with the default gateway IP address) (operation 402) and issue an ARP request for the destination IP address of the packet (operation 404). The gateway can then determine a respective egress interface for the ARP request (operation 406).

For a respective egress interface, the gateway can determine whether the egress interface corresponds to a layer-2 subnet extension (operation 408). If the egress interface corresponds to an extension, the gateway can replace the current SPA of the ARP request with the IP address of the interface associated with the extension (operation 410) and forward the ARP request via the egress interface (operation 412). On the other hand, if the egress interface does not correspond to an extension, the gateway may forward the ARP request via the egress interface without changing the SPA of the ARP request (operation 412).

Figure 4B:
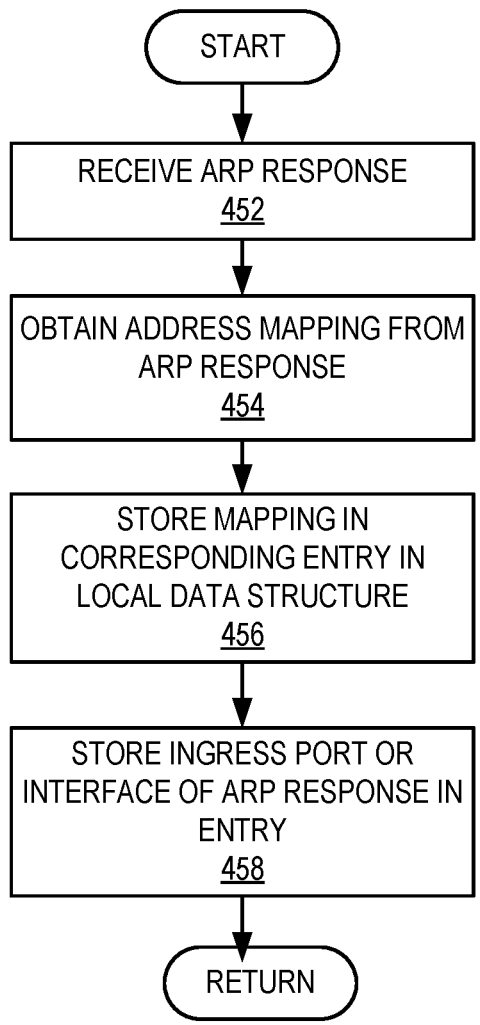
FIG. 4B presents a flowchart illustrating the process of a gateway of an extended subnet receiving an ARP response from a remote segment of the extended subnet, in accordance with an embodiment of the present application.

FIG. 4B presents a flowchart illustrating the process of a gateway of an extended subnet receiving an ARP response from a remote segment of the extended subnet, in accordance with an embodiment of the present application. During operation, the gateway can receive an ARP response (operation 452) and obtain the address mapping from the ARP response (operation 454). The gateway can store the mapping in a corresponding entry in a local data structure (e.g., an ARP table) (operation 456). The gateway may also store the ingress port or interface of the ARP response in the entry (operation 458).

Figure 5:
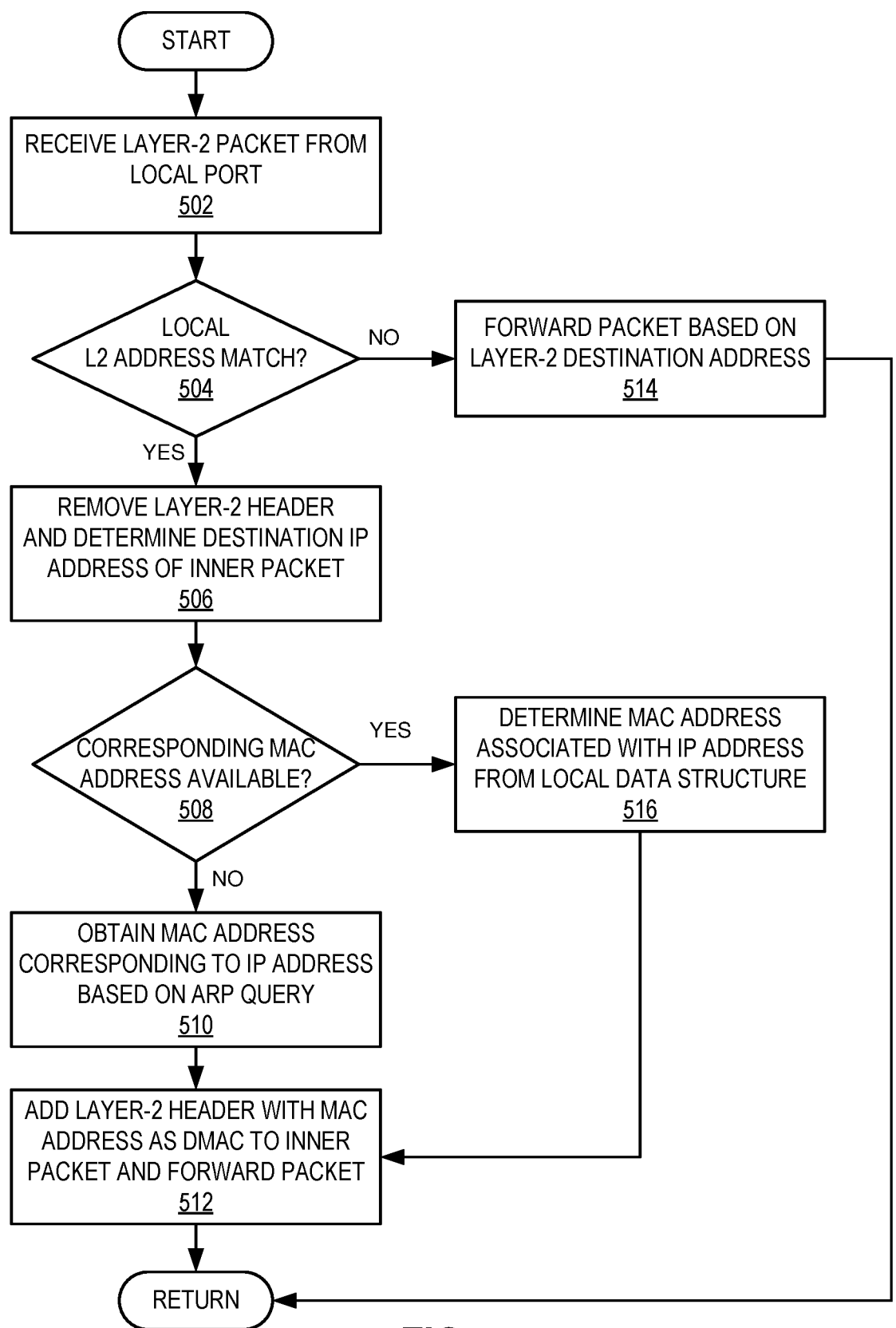
FIG. 5 presents a flowchart illustrating the process of a gateway of an extended subnet forwarding a packet from a local segment of the extended subnet, in accordance with an embodiment of the present application.

FIG. 5 presents a flowchart illustrating the process of a gateway of an extended subnet forwarding a packet from a local segment of the extended subnet, in accordance with an embodiment of the present application. During operation, the gateway can receive a layer-2 packet from a local port (operation 502) and determine whether a local layer-2 address matches the destination layer-2 address of the packet (operation 504). The local layer-2 address can be the MAC address allocated to the gateway.

If the local layer-2 address does not match, the layer-2 packet may not be destined to the gateway. The gateway can then forward the packet based on the layer-2 destination address (e.g., the destination MAC address) (operation 514). On the other hand, if the local layer-2 address matches, the gateway can remove the layer-2 header and determine the destination IP address of the inner packet (operation 506). The gateway can then determine whether the MAC address corresponding to the destination IP address is available in a local data structure (operation 508).

If the MAC address is available, the gateway can determine the MAC address associated with the IP address from the local data structure (e.g., an ARP table) (operation 516). On the other hand, if the MAC address is not available, the gateway can obtain the MAC address corresponding to the IP address based on an ARP query (operation 510). Upon determining the MAC address from the local data structure (operation 516) or obtaining the MAC address based on an ARP query (operation 510), the gateway can add a layer-2 header with the MAC address as the destination MAC address to the inner packet and forward the packet accordingly (operation 512).

Exemplary Computer System and Apparatus

Figure 6:
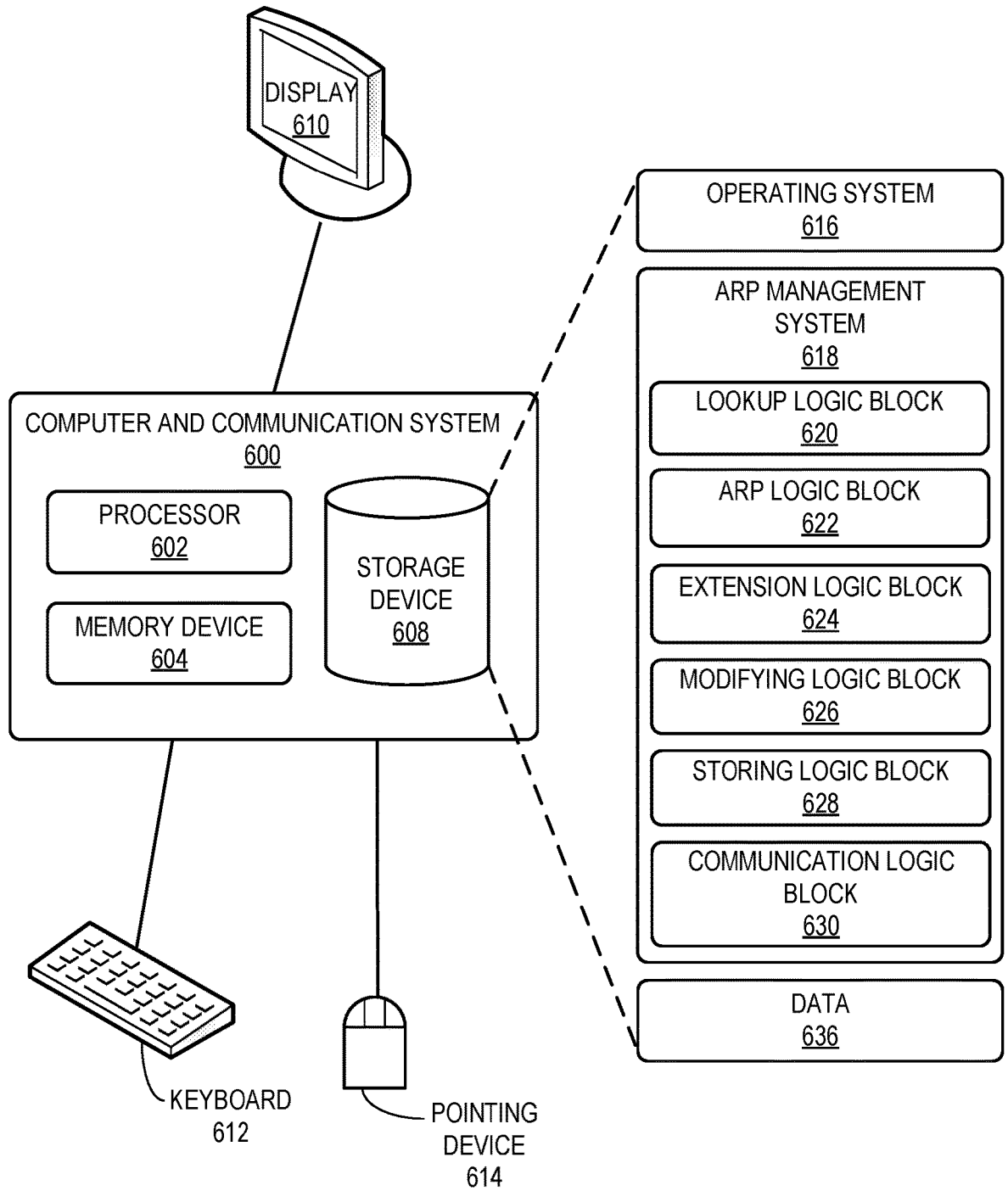
FIG. 6 illustrates an exemplary computer system that facilitates efficient address resolution in extended subnets, in accordance with an embodiment of the present application.

FIG. 6 illustrates an exemplary computer system that facilitates efficient address resolution in extended subnets, in accordance with an embodiment of the present application. Computer and communication system 600 includes a processor 602, a memory device 604, and a storage device 608. Memory device 604 can include volatile memory (e.g., a dual in-line memory module (DIMM)). Furthermore, computer and communication system 600 can be coupled to a display device 610, which can be capable of receiving an input (e.g., a touch screen), a keyboard 612, and a pointing device 614. Storage device 608 can store an operating system 616, an ARP management system 618, and data 636. ARP management system 618 can facilitate the ARP-related operations of gateway 128 in FIG. 1. It should be noted that, depending on the operations executed on a specific device, an instance of ARP management system 618 may include a subset of the logic blocks on that device.

ARP management system 618 can include instructions, which when executed by computer and communication system 600, can cause computer and communication system 600 to perform methods and/or processes described in this disclosure. Specifically, ARP management system 618 can include instructions for looking up the destination protocol address (e.g., an IP address) of a locally received packet in a local data structure (e.g., an ARP table) (lookup logic block 620). The lookup operation can allow ARP management system 618 to determine whether the hardware address (e.g., a MAC address) corresponding to the destination protocol address (e.g., an IP address) is available in the local data structure.

If the hardware address is not available, ARP management system 618 can include instructions for issuing an ARP query (e.g., an ARP request and a corresponding ARP response) (ARP logic block 622). Furthermore, ARP management system 618 can include instructions for determining whether an egress interface of an ARP request is associated with layer-2 subnet extension (extension logic block 624). ARP management system 618 can also include instructions for changing a default gateway IP address to the IP address of an extension interface in the SPA of an ARP request (modifying logic block 626). In addition, ARP management system 618 can include instructions for storing the address translation provided in an ARP response in the local data structure (storing logic block 628).

ARP management system 618 can also include instructions for sending and receiving RPCs, ARP queries, tunnel-encapsulated packets, and other layer-2 and/or layer-3 packets (communication logic block 630). Data 636 can include any data that is required as input or that is generated as output by the methods and/or processes described in this disclosure. Specifically, data 636 can include information in the local data structure.

Figure 7:
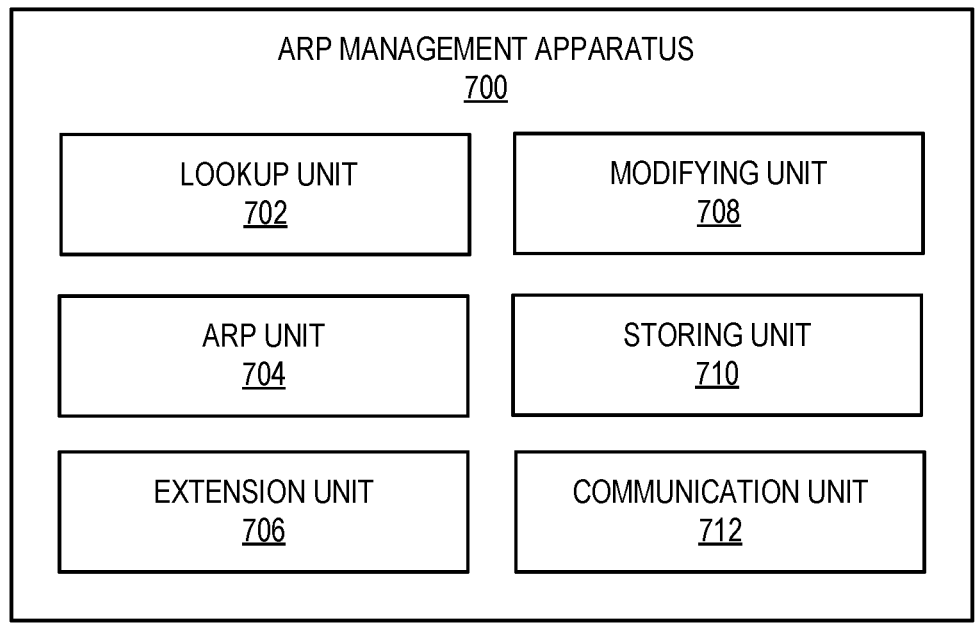
FIG. 7 illustrates an exemplary apparatus that facilitates efficient address resolution in extended subnets, in accordance with an embodiment of the present application.

FIG. 7 illustrates an exemplary apparatus that facilitates efficient address resolution in extended subnets, in accordance with an embodiment of the present application. ARP management apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device which is capable of communicating with other computer systems and/or devices. Apparatus 700 may also be a network device (e.g., a switch, a router, etc.).

Specifically, apparatus 700 can comprise units 702-712, which perform functions or operations similar to logic blocks 620-630 of computer and communication system 600 of FIG. 6, including: a lookup unit 702; an ARP unit 704; an extension unit 706; a modifying unit 708; a storing unit 710; and a communication unit 712.

Note that the above-mentioned logic blocks and modules can be implemented in hardware as well as in software. In one embodiment, these logic blocks and modules can be embodied in computer-executable instructions stored in a memory which is coupled to one or more processors in computer and communication system 600 and/or apparatus 700. When executed, these instructions cause the processor(s) to perform the aforementioned functions.

In summary, embodiments of the present invention provide a system and a method for facilitating efficient ARP resolution in an extended subnet. The system may operate on a gateway of a first network segment of the extended subnet. During operation, the system can determine that a layer-2 address corresponding to a layer-3 destination address of a packet is unavailable in a local data structure associated with ARP. The system can then determine whether a respective egress interface of an ARP request for the layer-3 destination address is associated with a layer-2 subnet extension from the first network segment to a second network segment of the extended subnet. The extension can provide a common layer-2 broadcast domain comprising the first and second network segments. Here, the first and second network segments can be associated with a same default gateway layer-3 address. If the egress interface is associated with the extension, the system can modify the ARP request by inserting a layer-3 address of a first endpoint associated with the extension as a source protocol address in the ARP request. A data connection between the first endpoint and a second endpoint at the second network segment can facilitate the extension. Subsequently, the system can send the modified ARP request to the second endpoint via the egress interface.

The methods and processes described herein can be embodied as code and/or data, which can be stored in a non-transitory computer-readable storage medium. When a computer system reads and executes the code and/or data stored on the non-transitory computer-readable storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating address resolution protocol (ARP) in an extended subnet across two network segments sharing a common gateway Internet Protocol (IP) address, the method comprising:
generating, by a local gateway of a local network segment, an ARP request to be broadcast via a local network interface on the local gateway to the local network segment, wherein the ARP request includes a target protocol address (TPA) and a source protocol address (SPA), and wherein the SPA includes the common gateway IP address;
modifying, by the local gateway, the ARP request by replacing the common gateway IP address with an interface IP address in the SPA to generate a modified ARP request comprising the same TPA and a modified SPA, wherein the interface IP address is different from the common gateway IP address and assigned to an external network interface of the local gateway coupled to a remote gateway of a remote network segment via a tunnel, and wherein the common gateway IP address is allocated to both the local gateway and the remote gateway;
forwarding, via the tunnel, the modified ARP request to the remote gateway for broadcasting the modified ARP request to the remote network segment; and
receiving, by the local gateway, an ARP response corresponding to the modified ARP request based on the interface IP address.

2. The method of claim 1, wherein the two network segments are at separate sites.

3. The method of claim 2, wherein the sites are located on customer premises or in a public cloud.

4. The method of claim 1, wherein the ARP response's TPA includes the interface IP address assigned to the external network interface of the local gateway.

5. The method of claim 1, wherein the tunnel is a virtual extensible local area network (VXLAN) tunnel; and
wherein the external network interface of the local gateway serves as a VXLAN Tunnel End Point (VTEP) for the tunnel.

6. The method of claim 1, further comprising storing an IP-to-MAC address mapping in a local data structure based on the ARP response.

7. The method of claim 1, wherein the ARP response is received via the external network interface based on the interface IP address.

8. A non-transitory computer-readable storage medium storing instructions that when executed by a computer cause the computer to perform a method for facilitating address resolution protocol (ARP) in an extended subnet across two network segments sharing a common gateway Internet Protocol (IP) address, the method comprising:
generating, by a local gateway of a local network segment, an ARP request to be broadcast via a local network interface on the local gateway to the local network segment, wherein the ARP request includes a target protocol address (TPA) and a source protocol address (SPA), and wherein the SPA includes the common gateway IP address;
modifying, by the local gateway, the ARP request by replacing the common gateway IP address with an interface IP address in the SPA to generate a modified ARP request comprising the same TPA and a modified SPA, wherein the interface IP address is different from the common gateway IP address and assigned to an external network interface of the local gateway coupled to a remote gateway of a remote network segment via a tunnel, and wherein the common gateway IP address is allocated to both the local gateway and the remote gateway; and
forwarding, via the tunnel, the modified ARP request to the remote gateway for broadcasting the modified ARP request to the remote network segment; and
receiving, by the local gateway, an ARP response corresponding to the modified ARP request based on the interface IP address.

9. The non-transitory computer-readable storage medium of claim 8, wherein the two network segments are at separate sites.

10. The non-transitory computer-readable storage medium of claim 9, wherein the sites are located on customer premises and in a public cloud.

11. The non-transitory computer-readable storage medium of claim 8, wherein the ARP response's TPA includes the interface IP address assigned to the external network interface of the local gateway.

12. The non-transitory computer-readable storage medium of claim 8, wherein the tunnel is a virtual extensible local area network (VXLAN) tunnel; and
wherein the external network interface of the local gateway serves as a VXLAN Tunnel End Point (VTEP) for the tunnel.

13. The non-transitory computer-readable storage medium of claim 8, wherein the method further comprises storing an IP-to-MAC address mapping in a local data structure based on the ARP response.

14. The non-transitory computer-readable storage medium of claim 8, wherein the ARP response is received via the external network interface based on the interface IP address.

15. A computer system, comprising:
a processor; and
a non-transitory computer-readable storage medium storing instructions that when executed by the processor cause the computer system to perform a method for facilitating address resolution protocol (ARP) in an extended subnet across two network segments sharing a common gateway Internet Protocol (IP) address, the method comprising:
generating, by a local gateway of a local network segment, an ARP request to be broadcast via a local network interface on the local gateway to the local network segment, wherein the ARP request includes a target protocol address (TPA) and a source protocol address (SPA), and wherein the SPA includes the common gateway IP address;
modifying, by the local gateway, the ARP request by replacing the common gateway IP address with an interface IP address in the SPA to generate a modified ARP request comprising the same TPA and a modified SPA, wherein the interface IP address is different from the common gateway IP address and assigned to an external network interface of the local gateway coupled to a remote gateway of a remote network segment via a tunnel, and wherein the common gateway IP address is allocated to both the local gateway and the remote gateway;
forwarding, via the tunnel, the modified ARP request to the remote gateway for broadcasting the modified ARP request to the remote network segment; and receiving, by the local gateway, an ARP response corresponding to the modified ARP request based on the interface IP address.

16. The computer system of claim 15, wherein the two network segments are at separate sites, and wherein the sites are located on customer premises or in a public cloud.

17. The computer system of claim 15, wherein the ARP response's TPA is-includes the interface IP address assigned to the external network interface of the local gateway.

18. The computer system of claim 15, wherein the tunnel is a virtual extensible local area network (VXLAN) tunnel; and wherein the external network interface of the local gateway serves as a VXLAN Tunnel End Point (VTEP) for the tunnel.

19. The computer system of claim 15, wherein the method further comprises storing an IP-to-MAC address mapping in a local data structure based on the ARP response.

20. The computer system of claim 15, wherein the ARP response is received via the external network interface based on the interface IP address.

\* \* \* \* \*